United States Patent
Orr

(10) Patent No.: US 7,769,024 B1
(45) Date of Patent: Aug. 3, 2010

(54) STATE-BASED TRAFFIC MANAGEMENT FOR CLASSIFIER-EQUIPPED SILICON SWITCHES

(75) Inventor: Michael Orr, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 105 days.

(21) Appl. No.: 11/874,511

(22) Filed: Oct. 18, 2007

Related U.S. Application Data

(60) Provisional application No. 60/862,698, filed on Oct. 24, 2006.

(51) Int. Cl.
*H04L 12/28* (2006.01)
*H04L 12/56* (2006.01)

(52) U.S. Cl. ............................. 370/395.32; 370/395.31

(58) Field of Classification Search ................. 370/389, 370/392, 393, 395.54, 235, 229, 395.31, 370/395.32, 382, 252; 709/200, 220–253; 711/216, 108, 220

See application file for complete search history.

(56) References Cited

U.S. PATENT DOCUMENTS

| | | | |
|---|---|---|---|
| 7,239,639 B2 * | 7/2007 | Cox et al. ............. | 370/395.43 |
| 7,305,708 B2 * | 12/2007 | Norton et al. ................. | 726/23 |
| 7,325,074 B2 * | 1/2008 | McRae ....................... | 709/242 |
| 7,424,744 B1 * | 9/2008 | Wu et al. ....................... | 726/23 |
| 7,436,830 B2 * | 10/2008 | Ben-Nun et al. ............ | 370/389 |
| 2003/0135641 A1 * | 7/2003 | Cheriton .................... | 709/238 |
| 2004/0213152 A1 * | 10/2004 | Matuoka et al. ............. | 370/230 |
| 2007/0008888 A1 * | 1/2007 | Chawla et al. .............. | 370/230 |
| 2007/0041318 A1 * | 2/2007 | Guru et al. .................. | 370/229 |

\* cited by examiner

*Primary Examiner*—Ayaz R Sheikh
*Assistant Examiner*—Chuong T Ho

(57) ABSTRACT

An apparatus includes a processor and a silicon switch. The silicon switch includes a network port to exchange packets of data with one or more networks and a packet classifier to select packets that satisfy one or more packet classification rules. Each of the packet classification rules describes at least one packet characteristic. The silicon switch further includes an action circuit to perform actions in response to processor commands. The processor generates each of the processor commands based on a plurality of the selected packets. The processor performs comparisons between each of the selected packets and at least one pattern, and generates the processor commands based on a history of results of the comparisons. The processor executes a computer program written in a scripting language. The computer program performs the comparisons. A pattern is added to the computer program at runtime without rebooting the apparatus.

13 Claims, 2 Drawing Sheets

STATE-BASED TRAFFIC MANAGEMENT FOR CLASSIFIER-EQUIPPED SILICON SWITCHES

CROSS-REFERENCE TO RELATED APPLICATIONS

This application claims the benefit of U.S. Provisional Patent Application Ser. No. 60/862,698, filed on Oct. 24, 2006, the disclosure thereof incorporated by reference herein in its entirety.

BACKGROUND

The present disclosure relates generally to data communications. More particularly, the present disclosure relates to state-based traffic management for classifier-equipped silicon switches.

Current silicon switches generally include a classifier and associated action logic. The classifier can examine a single frame while in transition, and check whether the frame matches one of a plurality of pre-programmed classification rules. When a match occurs, the action logic can apply some pre-determined action to the frame and/or the silicon switch, such as changing the content of the frame or closing a port of the switch. However, such silicon switches are able to examine only one frame at a time, and have no memory, so that an action can be based only upon a single frame.

SUMMARY

In general, in one aspect, the invention features an apparatus comprising: a processor; and a silicon switch including at least one network port to exchange packets of data with one or more networks, a packet classifier to select the packets that satisfy one or more packet classification rules, wherein each of the packet classification rules describes at least one packet characteristic, and an action circuit to perform actions in response to processor commands; and wherein the processor generates each of the processor commands based on a plurality of the selected packets.

In some embodiments, the silicon switch further comprises: a forwarding engine to transmit copies of the selected packets to the processor. In some embodiments, the processor performs a comparison between each of the selected packets and at least one pattern, and generates the processor commands based on a history of results of the comparisons. In some embodiments, the processor executes a computer program written in a scripting language; and the computer program performs the comparisons. In some embodiments, a user can modify the computer program at runtime. In some embodiments, the packet classifier selects the packets that satisfy the one or more packet classification rules and a sampling algorithm. In some embodiments, the packet characteristics comprise at least one of the group consisting of: a destination address of the packets of data; a source address of the packets of data; a type of the packets of data; an identifier of a network interface of the apparatus receiving the packets of data into the apparatus; an identifier of a network interface of the apparatus transmitting the packets of data from the apparatus; a data rate of the packets of data; a quantity of data in the packets of data; an identifier of a network device in a path of the packets of data; and a time of occurrence of the packets of data. In some embodiments, the actions comprise at least one of the group consisting of: modifying one or more of the packet classification rules; closing the at least one port; changing logical attributes of the at least one port; manifesting an alarm indication; dropping at least one of the packets having the at least one of the packet characteristics described by the respective packet classification rule; and modifying content of at least one of the packets having the at least one of the packet characteristics described by the respective packet classification rule. Some embodiments comprise a network device comprising the apparatus, wherein the network device is selected from the group consisting of: a network switch; a router; and a network interface controller.

In general, in one aspect, the invention features a method for an apparatus including a silicon switch, the method comprising: exchanging packets of data between the silicon switch and one or more networks, selecting the packets that satisfy one or more packet classification rules, wherein each of the packet classification rules describes at least one packet characteristic, generating processor commands, wherein each processor command is based on a plurality of the selected packets; and performing actions in the silicon switch in response to processor commands.

Some embodiments comprise transmitting copies of the selected packets from the silicon switch to a processor. Some embodiments comprise performing a comparison between each of the selected packets and at least one pattern; and generating the processor commands based on a history of results of the comparisons. Some embodiments comprise executing a computer program written in a scripting language; wherein the computer program performs the comparisons. In some embodiments, a user can modify the computer program at runtime. Some embodiments comprise selecting the packets that satisfy the one or more packet classification rules and a sampling algorithm. In some embodiments, the packet characteristics comprise at least one of the group consisting of a destination address of the packets of data; a source address of the packets of data; a type of the packets of data; an identifier of network interfaces of the apparatus receiving the packets of data into the apparatus; an identifier of the network interfaces of the apparatus transmitting the packets of data from the apparatus; a data rate of the packets of data; a quantity of data in the packets of data; an identifier of a network device in a path of the packets of data; and a time of occurrence of the packets of data. In some embodiments, the actions comprise at least one of the group consisting of: modifying one or more of the packet classification rules; closing one or more ports of the silicon switch; changing logical attributes of one or more ports of the silicon switch; manifesting an alarm indication; dropping at least one of the packets having the at least one of the packet characteristics described by the respective packet classification rule; and modifying content of at least one of the packets having the at least one of the packet characteristics described by the respective packet classification rule.

In general, in one aspect, the invention features an apparatus comprising: means for processing data; and means for switching packets of data, the means for switching including at least one network port means for exchanging packets of data with one or more networks, packet classifier means for selecting the packets that satisfy one or more packet classification rules, wherein each of the packet classification rules describes at least one packet characteristic, and action means for performing actions in response to processor commands; and wherein the means for processing generates each of the processor commands based on a plurality of the selected packets.

In some embodiments, the means for switching further comprises: forwarding means for transmitting copies of the selected packets to the means for processing. In some embodiments, the means for processing performs a comparison between each of the selected packets and at least one pattern, and generates the processor commands based on a history of results of the comparisons. In some embodiments, the means for processing executes a computer program written in a scripting language; and the computer program performs the comparisons. In some embodiments, a user can modify the computer program at runtime. In some embodiments, the packet classifier means selects the packets that satisfy the one or more packet classification rules and a sampling algorithm. In some embodiments, the packet characteristics comprise at least one of the group consisting of: a destination address of the packets of data; a source address of the packets of data; a type of the packets of data; an identifier of a network interface of the apparatus receiving the packets of data into the apparatus; an identifier of a network interface of the apparatus transmitting the packets of data from the apparatus; a data rate of the packets of data; a quantity of data in the packets of data; an identifier of a network device in a path of the packets of data; and a time of occurrence of the packets of data. In some embodiments, the actions comprise at least one of the group consisting of: modifying one or more of the packet classification rules; closing the at least one network port means; changing logical attributes of the at least one network port means; manifesting an alarm indication; dropping at least one of the packets having the at least one of the packet characteristics described by the respective packet classification rule; and modifying content of at least one of the packets having the at least one of the packet characteristics described by the respective packet classification rule. Some embodiments comprise a network device comprising the apparatus, wherein the network device is selected from the group consisting of: a network switch; a router; and a network interface controller.

In general, in one aspect, the invention features a computer program executable on a processor of an apparatus including a silicon switch to exchange packets of data between the silicon switch and one or more networks, the computer program comprising: instructions for selecting the packets that satisfy one or more packet classification rules, wherein each of the packet classification rules describes at least one packet characteristic, instructions for generating processor commands, wherein each processor command is based on a plurality of the selected packets; and instructions for performing actions in the silicon switch in response to the processor commands.

Some embodiments comprise instructions for transmitting copies of the selected packets from the silicon switch to the processor. Some embodiments comprise instructions for performing a comparison between each of the selected packets and at least one pattern; and instructions for generating the processor commands based on a history of results of the comparisons. In some embodiments, the computer program is written in a scripting language. In some embodiments, a user can modify the computer program at runtime. Some embodiments comprise instructions for selecting the packets that satisfy the one or more packet classification rules and a sampling algorithm. In some embodiments, the packet characteristics comprise at least one of the group consisting of a destination address of the packets of data; a source address of the packets of data; a type of the packets of data; an identifier of network interfaces of the apparatus receiving the packets of data into the apparatus; an identifier of the network interfaces of the apparatus transmitting the packets of data from the apparatus; a data rate of the packets of data; a quantity of data in the packets of data; an identifier of a network device in a path of the packets of data; and a time of occurrence of the packets of data. In some embodiments, the actions comprise at least one of the group consisting of: modifying one or more of the packet classification rules; closing one or more ports of the silicon switch; changing logical attributes of one or more ports of the silicon switch; manifesting an alarm indication; dropping at least one of the packets having the at least one of the packet characteristics described by the respective packet classification rule; and modifying content of at least one of the packets having the at least one of the packet characteristics described by the respective packet classification rule.

The details of one or more implementations are set forth in the accompanying drawings and the description below. Other features will be apparent from the description and drawings, and from the claims.

Figure 1:
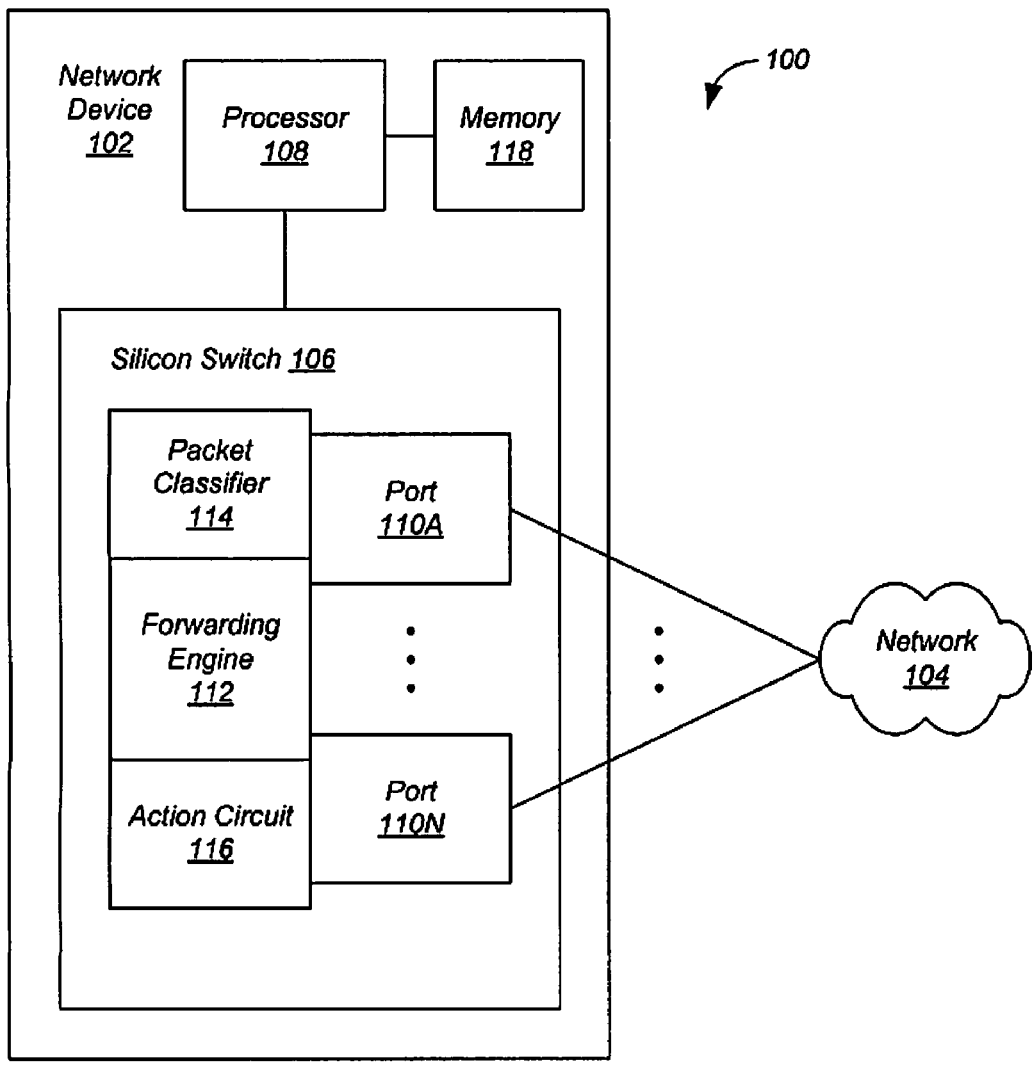
FIG. 1 shows a data communication system comprising a network device in communication with a network according to some embodiments of the present invention.

The leading digit(s) of each reference numeral used in this specification indicates the number of the drawing in which the reference numeral first appears.

DETAILED DESCRIPTION

Embodiments of the present invention provide traffic management for classifier-based silicon switches. A silicon switch is a dedicated hardware switch that can be programmed, and that is capable of high-speed packet switching, as is well-known in the relevant arts. A classifier is a mechanism for selecting packets according to classification rules, and applying desired actions to matching packets, as is well-known in the relevant arts.

According to embodiments of the present invention, the silicon switch is programmed by a processor to send copies of packets received by the silicon switch to the processor when the packets satisfy one or more packet classification rules. The processor performs a comparison between each of the copies of the packets and at least one pattern, and generates processor commands based on a history of results of the comparisons. An action circuit in the silicon switch performs actions in response to the processor commands, for example by dropping similar packets, manifesting an alarm indication, and the like, as described below. The computer program is written in a scripting language such as AWK or Perl, thereby allowing users to modify the computer program easily.

FIG. 1 shows a data communication system 100 comprising a network device 102 in communication with a network 104 according to some embodiments of the present invention. Network 104 can be implemented as a wide-area network such as the Internet, a local-area network (LAN), or the like. Network device 102 can be implemented as a switch, router, network interface controller (NIC), and the like. While embodiments of the present invention are described with respect to network communications, they are equally applicable to devices employing other forms of data communications such as direct links and the like.

Although in the described embodiments, the elements of data communication system 100 are presented in one arrangement, other embodiments may feature other arrangements, as will be apparent to one skilled in the relevant arts based on the disclosure and teachings provided herein. For example, the elements of data communication system 100 can be implemented in hardware, software, or combinations thereof.

Network device 102 includes a silicon switch 106 in communication with network 104 and a processor 108 in communication with silicon switch 106 and a memory 118. Silicon switch 106 includes at least one network port 110 to exchange packets of data with network 104, and a forwarding engine 112 to transfer the packets among network ports 110, and to transmit copies of selected packets to processor 108. Silicon switch 106 also includes an action circuit 116 to perform actions in response to processor commands generated by processor 108, and a packet classifier 114 to select packets that satisfy one or more packet classification rules. Processor 108 generates each of the processor commands based on a plurality of the selected packets, as described in detail below.

Figure 2:
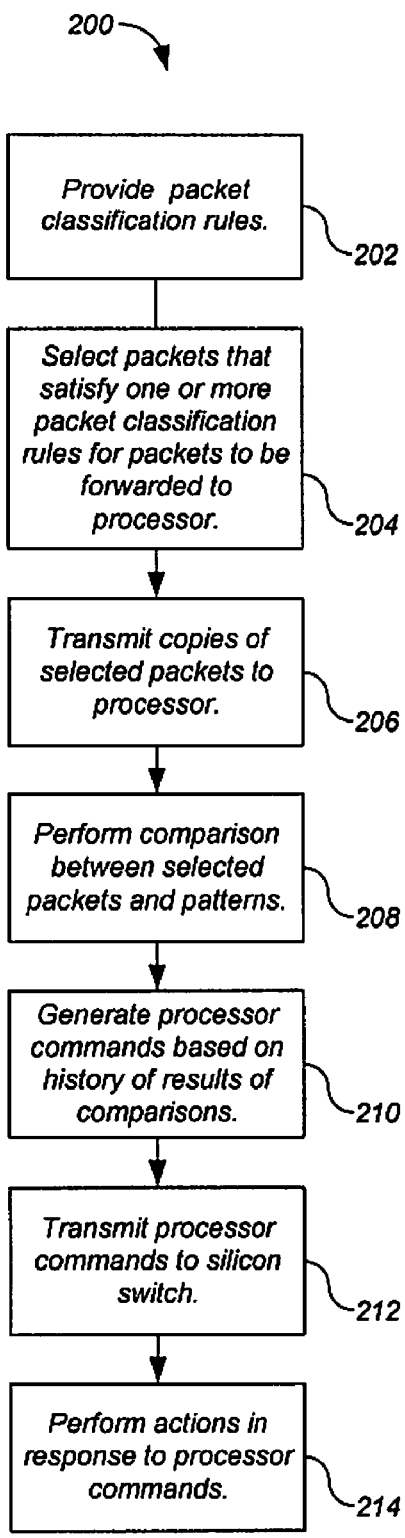
FIG. 2 shows a process for the data communication system of FIG. 1 according to some embodiments of the present invention.

FIG. 2 shows a process 200 for data communication system 100 of FIG. 1 according to some embodiments of the present invention. Although in the described embodiments, the elements of process 200 are presented in one arrangement, other embodiments may feature other arrangements, as will be apparent to one skilled in the relevant arts based on the disclosure and teachings provided herein. For example, in various embodiments, some or all of the steps of process 200 can be executed in a different order, concurrently, and the like.

Referring to FIG. 2, one or more packet classification rules are provided to packet classifier 114 (step 202). Each of the packet classification rules describes at least one packet characteristic, as is well-known in the relevant arts. For example, the packet characteristics can include destination addresses of the packets of data, source addresses of the packets, types of the packets, identifiers of network interfaces receiving the packets into network device 102, identifiers of network interfaces transmitting the packets from network device 102, data rates of the packets, quantities of data in the packets, identifiers of other network devices in the paths of the packets, times of occurrence of the packets, and the like. The packet classification rules can be provided to silicon switch 106 by processor 108, by some other network device over network 104, provisioned in advance, and the like. The packet classification rules include rules for selecting packets to be forwarded to processor 108. The packet classification rules can also include rules for classifier 114 to act upon packets locally, without processor 108.

Packet classifier 114 selects the packets handled by silicon switch 106 that satisfy one or more of the packet classification rules for forwarding the packets to processor 108 (step 204). In some embodiments the number of packets that satisfy these packet classification rules in a particular interval is so large as to over-burden processor 108. In these embodiments, packet classifier 114 selects the packets according to the packet classification rules and a sampling algorithm in order to reduce the number of selected packets while generating a statistically-correct representation of traffic passing through silicon switch 106. Any sampling algorithm can be used, such as statistical sampling, sampling by address, by time, by port, and the like.

Forwarding engine 112 transmits copies of the selected packets to processor 108 (step 206). In some embodiments, the original packet is dropped.

Processor 108 performs a comparison between each of the selected packets and at least one pattern (step 208). Each pattern can be a predetermined pattern of bits, don't-care characters, and the like, and can be compared to any part of a packet, such as the header, payload, and the like, and can be stored in memory 118. The patterns can be used to detect network-based attacks. For example, a pattern can be used to detect a Trojan attack that employs Internet Control Message Protocol (ICMP) of a certain type, to detect a packet that uses an unused Transmission Control Protocol (TCP) port, to detect illegal flag combinations in TCP synchronization (SYN) packets, and the like.

Processor 108 executes a computer program that performs the comparisons. The computer program can be written in a scripting language, including text processing languages such as AWK and Perl. The use of scripting languages allows new patterns to be added easily. Patterns can even be added by users at runtime without requiring a reboot of network device 102.

Executing the computer program, processor 108 generates processor commands based on a history of results of the comparisons (step 210). That is, each command is based on multiple selected packets. For example, each command can be based on multiple comparisons, multiple prior commands, and the like. The use of comparison history allows the use of state-based rules, baseline establishment and trend discovery, and the like.

Processor 108 transmits the processor commands to silicon switch 106 (step 212). Action circuit 116 performs actions in response to the processor commands (step 214). The actions can include changing the configuration of silicon switch 106 to change the handling of incoming packets, changing the internal state of the computer program executed by processor 108, acting upon the packet or packets that triggered the action, and the like. For example, the actions can include modifying one or more of the packet classification rules, closing one or more network ports 110, changing logical attributes of one or more network ports 110, manifesting an alarm indication, dropping some or all subsequent packets having the packet characteristics described by a packet classification rule, modifying content of some or all subsequent packets having the packet characteristics described by a packet classification rule, and the like.

Now an example operation of network device 102 of FIG. 1 is described. Many Trojans and botnets rely on Internet Control Message Protocol (ICMP) as the master-to-zombie control channel. The following example describes how network device 102 can handle such an attack.

In a Baseline state, network device 102 establishes a "normal" baseline traffic pattern (that is, a traffic pattern without an attack). In this state, processor 108 programs classifier 114 to match and count incoming and outgoing ICMP frames. Processor 108 periodically checks the counters, and builds statistics of ICMP traffic, for example by hour, day, week, business hours vs. non-business hours, weekends vs. workdays, and the like. Once a baseline is established, network device 102 enters a Trend-Watching state.

In the Trend-Watching state, processor 108 programs classifier 114 to continue to match and count incoming and outgoing ICMP frames, and in addition, to compare the result to programmed limits established during the Baseline state. If the count exceeds a limit, classifier 114 notifies processor 108, which the moves to a Find Suspect Interface state.

In the Find Suspect Interface state, processor 108 programs classifier 114 to employ two counters to separately count ICMP frame from two groups of network interfaces. Processor 108 changes the counters and the network interfaces in the two groups so as to perform a binary search for the port 110 that is sending/receiving the most ICMP traffic. Once a suspect network interface is identified, processor 108 moves to a Find Suspect Machine state.

Processor 108 can also download, from a suitable server on the network, either updates or even a complete database of patterns that identify particular Trojans. If memory 118 is not large enough to keep an on-board database of all patterns for all threats, processor 108 can download a database for the current threat. In extreme cases processor 108 can even use such a database in pieces and replace each piece as it is used and no longer needed.

In the Find Suspect Machine state, processor 108 programs classifier 114 to mirror all ICMP frames on the suspect network interface to processor 108. Processor 108 matches the mirrored frames to the patterns in the threat database, when a match is found, identifies as suspect the machine that is the source or target of the mirrored ICMP frames, and enters a Monitor Suspect Machine state.

In the Monitor Suspect Machine state, processor 108 programs classifier 114 to match traffic of interest from the suspect machine, and to mirror that traffic to processor 108. For example, processor 108 can program classifier 114 to mirror all ICMP frames and all emails from the suspect machine. Processor 108 now matches the ICMP frames to the threat database to identify any and all Trojans that may be active, and in addition, extracts the destination address from all outgoing email messages. If there are too many destinations, so the frequency of sending emails is too high (as determined by limits either set during the Baseline state, or set by the system administrator), then the suspect machine is sending junk emails. Processor 108 then enters a Mitigation state.

In the Mitigation state, processor 108 programs classifier 114 and/or action circuit 116 for various mitigation actions, and in parallel, generates logs, alerts, and the like for the system administrator. For example, the actions can include limiting the amount of traffic allowed, or even blocking the traffic completely, with the suspect machine. This action can include all traffic types, or can allow some and deny others. For example, the actions can allow printing access to local mission-critical services (such as a customer database), but deny emails and web browsing. The actions can also include copying all suspect traffic to a side-standing server, for thorough human analysis.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
 a processor; and
 a silicon switch including
  a network port to exchange packets of data with one or more networks,
  a packet classifier to select packets that satisfy one or more packet classification rules, wherein each of the packet classification rules describes at least one packet characteristic, and
  an action circuit to perform actions in response to processor commands,
 wherein the processor generates each of the processor commands based on a plurality of the selected packets,
 wherein the processor performs comparisons between each of the selected packets and at least one pattern, and wherein the processor generates the processor commands based on a history of results of the comparisons,
 wherein the processor executes a computer program written in a scripting language,
 wherein the computer program performs the comparisons, and
 wherein a pattern is added to the computer program at runtime without rebooting the apparatus.

2. The apparatus of claim 1, wherein the silicon switch further comprises:
 a forwarding engine to transmit copies of the selected packets to the processor.

3. The apparatus of claim 1:
 wherein the computer program is modified at runtime.

4. The apparatus of claim 1:
 wherein the packet classifier selects the packets that satisfy the one or more packet classification rules and a sampling algorithm.

5. The apparatus of claim 1, wherein the packet characteristics comprise at least one of the group consisting of:
 a destination address of the packets of data;
 a source address of the packets of data;
 a type of the packets of data;
 an identifier of a network interface of the apparatus receiving the packets of data into the apparatus;
 an identifier of a network interface of the apparatus transmitting the packets of data from the apparatus;
 a data rate of the packets of data;
 a quantity of data in the packets of data;
 an identifier of a network device in a path of the packets of data; and
 a time of occurrence of the packets of data.

6. The apparatus of claim 1, wherein the actions comprise at least one of the group consisting of:
 modifying one or more of the packet classification rules;
 closing the network port;
 changing logical attributes of the network port;
 manifesting an alarm indication;
 dropping at least one of the packets having the at least one of the packet characteristics described by the respective packet classification rule; and modifying content of at least one of the packets having the at least one of the packet characteristics described by the respective packet classification rule.

7. A network device comprising the apparatus of claim 1, wherein the network device is selected from the group consisting of:
- a network switch;
- a router; and
- a network interface controller.

8. A method for an apparatus including a silicon switch, the method comprising:
- exchanging packets of data between the silicon switch and one or more networks;
- selecting packets that satisfy one or more packet classification rules, wherein each of the packet classification rules describes at least one packet characteristic;
- generating processor commands, wherein each of the processor commands is generated based on a plurality of the selected packets;
- performing comparisons between each of the selected packets and at least one pattern;
- generating the processor commands based on a history of results of the comparisons;
- executing a computer program written in a scripting language, wherein the computer program performs the comparisons, and wherein a pattern is added to the computer program at runtime without rebooting the apparatus; and
- performing actions in the silicon switch in response to the processor commands.

9. The method of claim 8, further comprising:
transmitting copies of the selected packets from the silicon switch to a processor.

10. The method of claim 8, further comprising:
modifying the computer program at runtime.

11. The method of claim 8, further comprising:
selecting the packets that satisfy the one or more packet classification rules and a sampling algorithm.

12. The method of claim 8, wherein the packet characteristics comprise at least one of the group consisting of:
- a destination address of the packets of data;
- a source address of the packets of data;
- a type of the packets of data;
- an identifier of network interfaces of the apparatus receiving the packets of data into the apparatus;
- an identifier of the network interfaces of the apparatus transmitting the packets of data from the apparatus;
- a data rate of the packets of data;
- a quantity of data in the packets of data;
- an identifier of a network device in a path of the packets of data; and
- a time of occurrence of the packets of data.

13. The method of claim 8, wherein the actions comprise at least one of the group consisting of:
- modifying one or more of the packet classification rules;
- closing one or more ports of the silicon switch;
- changing logical attributes of one or more ports of the silicon switch;
- manifesting an alarm indication;
- dropping at least one of the packets having the at least one of the packet characteristics described by the respective packet classification rule; and
- modifying content of at least one of the packets having the at least one of the packet characteristics described by the respective packet classification rule.

\* \* \* \* \*